DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 2, 1970

875 O.G. 11

T875,002

SYNERGISTIC INSECTICIDAL COMPOSITIONS AND METHOD OF USE

Ronald Eugene Montgomery, Middleport, and Harry Hobart Incho, Medina, N.Y., assignors to FMC Corporation, New York, N.Y., a corporation of Delaware

Filed Nov. 15, 1968, Ser. No. 776,247

Int. Cl. A01n *9/02, 9/24, 9/36*

U.S. Cl. 424—219

No Drawing. 12 Pages Specification

Synergistic insecticidal combinations of esters of chrysanthemumic acid, for example pyrethrins, allethrin, and (1 - cyclohexene - 1,2 - dicarboximido)methyl chrysanthemumate, with certain di-ω-alkynyl haloalkylphosphonate synergists, are described. These synergists have the general formula:

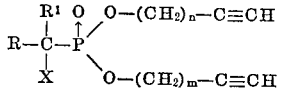

wherein X is halogen; R and $R^1$ are each hydrogen, halogen, lower alkyl or halogenated lower alkyl; and *n* and *m* are each integers from one to four inclusive. The preparation of representative compounds of this class of di-ω-alkynyl haloalkylphosphonates, for example di-3-butynyl chloromethylphosphonate, and the synergistic activity of said phosphonate with respresentative chrysanthemumate insecticides, are described in detail.